July 10, 1956 — G. C. SULLIVAN — 2,753,642
GUN STOCK OF EXPANDED CELLULAR PLASTIC MATERIAL
Filed Dec. 10, 1951
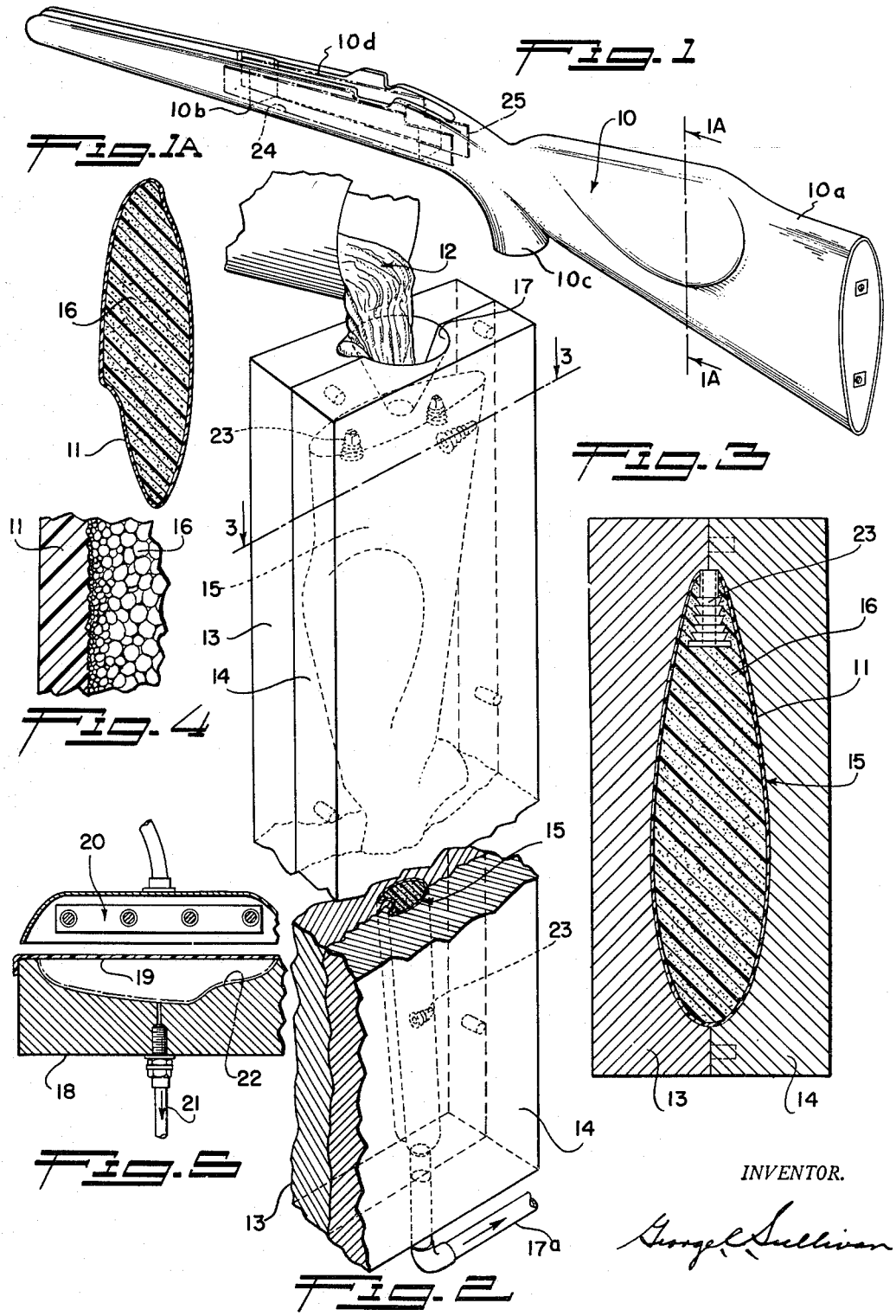
INVENTOR.
George C. Sullivan United States Patent Office 2,753,642
Patented July 10, 1956

2,753,642

GUN STOCK OF EXPANDED CELLULAR PLASTIC MATERIAL

George C. Sullivan, Hollywood, Calif.

Application December 10, 1951, Serial No. 260,795

6 Claims. (Cl. 42—71)

This invention relates to articles or products of manufacture wherein the core of such products are made from materials which are capable of being foamed or expanded into a cellular form. My invention is particularly suitable for use with certain types of foamed plastic materials, and is most suitable when such foamed plastic materials are castable in place. However, it is to be understood that whenever throughout this specification reference is made to "foamed plastic" or the like, I refer not only to that specific material but to such other materials as may be cellular expanded and which result in similar qualities.

The articles or devices of this invention have many applications wherein a core of light-weight material is desired, and a stronger, substantially non-porous, exterior skin is preferred. For instance, in the sporting field alone, there are many applications of merit, such as gun stocks, game or wild life decoys, flotation equipment such as life preservers, and the like.

Heretofore, in the case of the gun stock, such articles have been manufactured usually from a high quality wood, the most popular being walnut. These stocks are roughened out of wood on a lathe, the cutter of which follows a template or pattern of the desired shape. The stock is then finished by conventional wood working and finishing methods requiring considerable manual labor if a fine stock is produced. This process is quite complicated and costly and the article is heavy. The finer quality woods are becoming somewhat scarce, which makes it important to find a proper substitute.

As regards other types of sporting equipment, such as decoys, life preservers and the like, the best of such articles have been manufactured in the past by using such materials as cork and balsa and other light weight woods, most of which are becoming more scarce on the market. These materials have to be fastened into blocks of suitable size, trimmed to final shape and sometimes attached to or inserted into containers for practical use.

The use of a foamed plastic is particularly advantageous in these applications because of its inherent property of being castable in place, that is to say, cast into a mold or other container of irregular shape and dimensions. The core can be provided with an exterior skin which will surround and adhere to the core, thus producing a toughened, strengthened non-porous product which will withstand the elements and practical handling which accompanies the use of such products in every day life. The physical strength characteristics of the articles of this invention, in its preferred embodiment, are increased considerably by the fact that the skin and core materials are joined at the interfaces by somewhat of a chemical union which produces a good adhering or locking effect; the two materials becoming bonded together to approach homogeneity.

It is, accordingly, the principal object of the present invention to provide a light-weight article and a simple, rapid and commercially practical method for fabricating such articles embodying an internal low density core and a skin of practical physical characteristics. It is also an object of this invention to provide an article which is a completely satisfactory substitute for current products of manufacture and to manufacture the same on a production basis which results in a good article at a more economical price.

A further object is to provide a method of manufacture which utilizes only simple and inexpensive tooling or equipment, such as a split-type mold or die, possibly a curing oven and a vacuum pump, other accessory equipment and the materials and ingredients.

Other objectives and features of the invention will become apparent from the following detailed description of a typical manner of performing the manufacturing operations which result in production of the article of this invention; throughout which description reference is made to the accompanying drawing wherein:

Figure 1 is a perspective view of a typical gun stock illustrating the cutouts for a typical action or receiver and a barrel;

Figure 1A is a sectional view of Figure 1 taken substantially as indicated by line 1A—1A on Figure 1 showing the external skin surrounding the plastic foam core material;

Figure 2 is a perspective view of a typical assembled mold employed in the method of manufacture as disclosed in this invention; the dotted lines representing the mold cavity, embedded elements in the stock, die pins and the like;

Figure 3 is a sectional view, taken substantially as indicated by line 3—3 of Figure 2, showing the gun stock fabricated with external skin and foamed core (sectionalized portion) inserted within the split-type mold or die;

Figure 4 is an enlarged fragmentary detail of the gun stock showing the manner in which the foamed core secures itself to the external skin; and Figure 5 is a sectional view of a typical method of producing the external skins of the gun stock as will be described hereinafter.

The method provided by this invention is useful in making objects or devices varying greatly in intended use of application. I will describe herein the methods as employed to construct a typical gun stock, a preferred article of manufacture; it being understood that this is only one typical application of the invention.

A typical gun stock is illustrated in Figure 1 indicated as 10, which consists essentially of a butt portion 10a and a forestock portion 10b. The butt portion 10a extends from the butt plate portion forward to the grip area 10c. The forestock portion 10b extends from the grip portion 10c forward and includes the receiver or action cavity 10d. It is to be understood that different designs of gun stocks will have different proportions and arrangements of components, but each gun stock will have essentially a butt portion and a forestock portion.

The method of the invention as principally illustrated by Figures 2, 3 and 5, used in the fabrication of a typical gun stock 10, may be said to comprehend the general steps of providing a skin material 11 on the surfaces of a split-type mold or die 13—14, introducing a reactant plastic mixture 12 into the mold cavity 15, allowing the mixture to react to form a foamed or cellular core 16 to bond with and fill the cavity which is surrounded by the external skin 11; post-curing the skin 11 prior to the foaming step and finally post-curing the resultant article. The process steps may, if desired, be somewhat reversed by using a two-mold process; the first mold forming a slightly undersized core 16 and the second mold forming the skin 11 about the core 16.

There are several methods available for the fabrication of the article of this invention. One method, which might be termed a "fill and drain" method comprises the filling of the cavity 15 through the mold entrance 17 with a casting resin (phenolic, melamine or urea formaldehyde); pouring or draining out such resin from the mold cavity, allowing a portion of the resin to remain adhered to the sides of the mold cavity 15; and subsequently curing such adhered resin portion to form a skin 11. The reactant plastic mixture 12 can then be poured into the cavity 15 through the entrance 17 and allowed to react and rise, thus completely filling the mold cavity 15 and forming a light-weight, rugged gun stock 10.

A second method of fabrication which could be termed a "bi-mold" process would preferably use two molds, one for the fabrication of the core and the other for completing the fabrication of the gun stock by inserting the core within an oversized mold and casting the resin in between the core and walls of the cavity. In such method, the prefabricated core produced by an undersized mold is inserted within an oversized mold, care being taken to be certain that the core is centered within the mold cavity, thus insuring substantially equal skin thicknesses about the periphery of the gun stock. The casting resin can be placed within the mold cavity prior to inserting the core, in which case the resin works itself up the mold cavity, in and around the core material to complete the gun stock. It may be found preferable to insert the casting resin under slight pressure in one end of the mold cavity and apply a suction pressure as represented by pipe 17a to the opposite end in order to be certain to eliminate all entrapped air and to obtain a stock without any skin blemishes. It may be found that the second mold can be eliminated by taking the core produced by the first mold and dipping or spraying the same with casting resin, curing the same, repeating the process until a proper skin thickness is attained. This method, however, is not believed to result in as consistent a product as when made with the mold process. These latter two methods result, however, in a good bonding between skin and core as the skin material tends to penetrate within the outer layer of cells forming the core.

Another method of fabrication and the presently preferred one would provide for the making of the skin 11 in, say, two parts or halves; adhering the two parts together to form the completed skin 11, and finishing the gun stock 10 by casting the plastic core material 12 into the completed skin 11 wherein it will expand cellularly and adhere to the skin. The two halves of the skin 11 can be produced by using a conventional mold or die 18 as illustrated in Figure 5, laying and clamping if desired a sheet of thermoplastic skin material 19 over the die 18, heating the same with appropriate heating elements 20 until such time as the material 19 is softened and flexible, and then drawing the material 19 until it conforms to the inside contour of the die 18 by using suction pressure 21 between the cavity and the sheet of material 19; its final shape being represented by the dashed line 22. The two parts thus formed may be adhered together by using standard and conventional cements, after which the completed shell is filled with the cellular plastic core as explained above. An appropriate material for the skin 19 is a thermoplastic sheet of tough, synthetic, rubber-like plastic such as is manufactured and sold by the U. S. Rubber Company under the tradename Royalite; this material being particularly advantageous in that it softens at reasonably low temperatures, cures promptly and does not require the use of a "parting" material to prevent sticking to the die or mold. I have found it possible to form both halves of the skin 11 at one time by mounting the two dies 13 and 14 together with sheet of material 19 for each die therebetween; heating the same by inserting the dies 13 and 14 into an oven or by pumping heated air into the cavity 15 until such time as the material 19 is softened properly so that the same can be drawn into proper shape by means of the suction pressure 21. This procedure permits the foaming operation to be done immediately, thus producing substantially a completed gun stock upon removing the article from the die. The flash can be trimmed off and minor finishing techniques applied.

Other methods of fabrication can be used to obtain the resultant product of this invention without departing from the scope of the invention, the method above described being the preferred and probably most practical one.

The material of the mold 13—14 can be plaster, metal or plastic; typical ones being ceramic-type plaster of Paris, Kirksite or sprayed metal and Reslyn, a phenolic plastic casting material. As previously disclosed, a typical casting resin to form the skin would be of the phenolic, melamine or urea-formaldehyde family, or a polyester resin by itself or in combination with fiber additives to form a resin-impregnated fibrous material. A typical core material would be a reactant alkyd resin meta-toluene-diisocyanate mixture; a great deal of information about which may be found in the art and literature. The following is a typical formation to be employed in producing the foamed core.

```
Alkyd resin component:                                    Grams
  Tri-methylol propane, 4 mols_____⎤
  Adipic acid, 2.5 mols_____⎬60
  Phthalic anhydride (acid number of 20 and water
    content of from 0.65 to 2.0%), 0.5 mols_____⎦
Reactant component:
  Meta-toluene diisocyanate containing from 2 to 6
    grams ethyl cellulose of from 50 to 100 centipoises
    viscosity and having an ethoxyl content of from 45
    to 49.5% per 100 grams of the meta-toluene diiso-
    cyanate_____  40
```

The two components are mixed thoroughly and poured into the cavity of the mold wherein the reaction will take place, thus foaming and filling the cavity. These materials are particularly advantageous in that they will react at room temperature and atmospheric pressure; the ethyl cellulose being added to give proper consistency to the mixture and to increase the physical properties of the resultant product. The meta-toluene diisocyanate through reaction with the alkyd resin serves as the catalyst to extend the molecular weight of the alkyd resin; also, through reaction with water present in the alkyd resin, it serves as a gassing component liberating carbon dioxide thereby. Therefore, the meta-toluene diisocyanate can be considered as a combined catalyst or activator-gassing agent component.

An alternative core material which has advantages as far as resistance to high temperatures and better economy would be a phenolic type foam or cellular plastic prepared from a phenolic resin, a gassing agent (carbonate or the like) and a catalyst. These type foams are being used in industry today, and much data and information is available. These ingredients result in a liquid reactant mixture which can be poured directly into a mold where it will react at room temperature and atmospheric pressure.

These foamed core materials are particularly good in that they are strong, light-weight and are castable in place, adhering well to most materials. Figure 4 shows the manner in which most of these material or foams adhere to other materials. If the skin 11 is roughened somewhat and is clean, the core material 16 will make a good bond therewith; usually small cells appearing at the joint line thus assuring an efficient bonding of the skin 11 and the core 16. If the core 16 is fabricated first, the skin 11 material will actually impregnate the cells of the core 16 and produce an unusually strong and efficient bond.

Referring to Figures 2 and 3, it will be seen that the use of a foamed core material 16 permits the casting in place of the necessary inserts 23 for the attachment of butt plates, sling swivels and the like. These inserts 23 can be designed with fins or other surface increasing means to insure that the same will be strongly attached and embedded in the core material 16. Strengthening elements 24 and 25 can also be embedded in the core material 16 at point of maximum stress to produce a gun stock of great strength; such elements being made Having described only typical forms of the invention I do not wish to be limited to the specific details herein set forth, but wish to reserve to myself any variations or modifications that may appear to those skilled in the art and fall within the scope of the following claims:

I claim:

1. A gun stock having a preformed external skin of durable material, a core of low density rigid expanded cellular plastic, said core being cast within said skin in such a manner that the skin and core are secured together by natural adhering action therebetween, said core having fastening elements embedded therein for the attachment of fittings and accessories.

2. A gun stock provided with a butt portion and a forestock portion, said forestock portion having a cavity for the reception of a receiver, said stock having an external skin, said skin consisting of a durable material, and a core of low-density, rigid, expanded cellular plastic, said core being cast within said skin in such a manner that the skin and the core are secured together by the natural adhering action of the cellular plastic and skin material to form a unitary structure.

3. A gun stock provided with a butt and a forestock, said gun stock having a cavity for the reception of a receiver and comprising an external skin portion and a core portion, said skin portion consisting of a durable material, said core portion consisting of a low-density, rigid, expanded cellular plastic material, said core being cast within said skin in such a manner that the skin and the core are secured together by the natural adhering action therebetween to form a unitary structure.

4. A gun stock provided with butt and forestock portions, and comprising an external skin portion and a core portion, said skin portion consisting of a durable material, said core portion consisting of a low-density, rigid, expanded cellular plastic material, said core being cast within said skin in such a manner that the skin and the core are secured together by the natural adhering action therebetween to form a unitary structure.

5. A gun stock provided with a butt portion and a forestock portion, said forestock portion having a cavity for the reception of a receiver, said stock comprising an external skin portion and a core portion, said skin portion consisting of a durable material surrounding said core, said core portion consisting of a low-density, rigid, expanded cellular plastic material and being cast to the contour of said gun stock, said skin and said core being secured together by the natural adhering action therebetween to form a unitary structure.

6. A gun stock provided with butt and forestock portions and comprising an external skin portion and a core portion, said gun stock being contoured and preformed to engage and support the receiver of a gun, said skin portion consisting of a durable material, said core portion consisting of a cast, low-density, rigid, expanded cellular plastic material, said core and skin being secured together by natural adhering action therebetween to form a unitary structure.

References Cited in the file of this patent

UNITED STATES PATENTS

| | | |
|---|---|---|
| 1,387,805 | Roberts | Aug. 16, 1921 |
| 2,076,412 | Oldham | Apr. 6, 1937 |
| 2,185,924 | Pereira | Jan. 2, 1940 |
| 2,205,891 | Sprenger | June 25, 1940 |
| 2,240,581 | Seward et al. | May 6, 1941 |
| 2,285,963 | Gits et al. | June 9, 1942 |
| 2,384,387 | Meyer | Sept. 4, 1945 |
| 2,394,327 | Niessen et al. | Feb. 5, 1946 |
| 2,439,137 | Keller | Apr. 6, 1948 |
| 2,473,722 | Nelson | June 21, 1949 |
| 2,525,966 | Smith et al. | Oct. 17, 1950 |

FOREIGN PATENTS

| | | |
|---|---|---|
| 344,954 | Great Britain | Mar. 19, 1931 |
| 979,843 | France | Dec. 13, 1950 |